United States Patent

[11] 3,607,931

[72] Inventors James Hegarty
 Nashua;
 Jon Thunberg, Milford; Corbet Johnson, Nashua, all of N.H.
[21] Appl. No. 837,345
[22] Filed June 27, 1969
[45] Patented Sept. 21, 1971
[73] Assignee W. R. Grace & Co.
 New York, N.Y.
 Continuation-in-part of application Ser. No. 716,003, Mar. 26, 1968, now abandoned, which is a continuation-in-part of application Ser. No. 660,135, Aug. 11, 1967, now abandoned, which is a continuation of application Ser. No. 382,947, July 15, 1964, now abandoned.

[54] METHOD FOR THE MANUFACTURE OF THE DISODIUM SALT OF ETHYLENEDIAMINETETRAACETIC ACID
 4 Claims, No Drawings

[52] U.S. Cl. .................................................. 260/534 E
[51] Int. Cl. ............................................... C07c101/20, C07c 101/26
[50] Field of Search .......................................... 260/534 E

[56] References Cited
UNITED STATES PATENTS

| 2,407,645 | 9/1946 | Bersworth | 260/534 E |
| 2,461,519 | 2/1949 | Bersworth | 260/534 E |
| 2,861,107 | 11/1958 | Bersworth | 260/534 E |

OTHER REFERENCES

Kubias, Chemical Abstracts Vol. 44:8824(f)1950

Primary Examiner—Lewis Gotts
Assistant Examiner—Jacqueline L. Davison
Attorney—Thomas B. Graham ABSTRACT: A process for making partial salts of polycarboxylic polyamino acid chelating agent compounds characterized by forming a solution of a polyamino polycarboxylic acid salt adjusting it to a pH level above the normal pH of the salt which it is desired to produce, evaporating, and separating from the mother liquor the desired partial salt which crystallized first thereby salvaging a useful mother liquor, producing a crystalline partial salt of the chelating agent which has the characteristic of being capable of going into aqueous solution in subsequent use at a rate far greater than partial salts prepared by conventional neutralization technique.

METHOD FOR THE MANUFACTURE OF THE DISODIUM SALT OF ETHYLENEDIAMINETETRAACETIC ACID

HISTORY OF THE APPLICATION

This application is a continuation-in-part of our application Ser. No 716,003, filed March 26, 1968, now abandoned which in turn is a continuation-in-part of our application Ser. No. 660,135, filed Aug. 11, 1967 now abandoned which in turn was a continuation of our application Ser. No. 382,947, filed July 15, 1964, now abandoned.

This invention is concerned with a method for the preparation of partially neutralized salts of polyfunctional amino carboxulic acids, such as ethylene diamine tetraacetic acid and nitrilo triacetic acid, particularly those salts which are 1 and 2 alkali metal units away from full neutralization of all acid positions.

Commonly, ethylene diamine tetraacetic acid is made by the condensation of ethylene diamine with formaldehyde and cyanide in a strongly alkaline medium to produce an alkaline salt containing about 40 percent of ethylene diamine tetraacetic acid. This is well exemplified in the U.S. Pat. No. 2,407,645, Bersworth.

Where ethylene diamine tetraacetonitrile or nitrilo triacetonitrile are first formed as precursor compounds, for example, as set for the U.S. Pat. No. 2,855,428, Singer and Weisberg, the preparation of the ethylene diamine tetraacetic acid or the nitrilo triacetic acid salts is a result of a hydrolysis operation and commonly the product will contain some alkali.

When it is desirable to prepare the disodium salt of ethylene diamine tetraacetic acid, it can be done by mixing sodium hydroxide flake with an appropriate molar amount of ethylene diamine tetraacetic acid containing about 5–15 percent water. This mixture is blended in the dry state and the heat of reaction is sufficient to evaporate the moisture, thereby producing a blend which is the disodium salts of EDTA. It can be further vacuum dried or air dried.

In a wet method of preparation, ethylene diamine tetraacetic acid is added to a dilute solution of sodium hydroxide until a pH of about 4.7 is reached; the solution ordinarily will be clear at this point. This solution is boiled until crystallization occurs and is then cooled very slowly. The resulting crystals are filtered or centrifuged off and vacuum or air dried. Following a similar procedure in preparing a clear solution by reaction of sodium hydroxide with acid, the solution can be spray dried.

It should be self-evident that any of these techniques which involve careful balancing of the reactants, time for reaction and, further, time for recovering the product, are cumbersome to the point of being undesirable when commercial application is necessary.

Accordingly, a fundamental object of our invention is to provide a basic technique to carry out crystallization to prepare compounds of ethylene diamine tetraacetic acid and nitrilo triacetic acid in neutral or slightly acid form, that is, 1 or 2 alkali metal moieties short of full neutralization of all acid hydrogens.

Other objects and advantages of the invention will in part be obvious and in part appear hereinafter.

Our invention, therefore, involves a technique of crystallizing the disodium salt of ethylene diamine tetraacetic acid from a solution composed of both ethylene diamine tetraacetic acid $Na_2$ salt and ethylene diamine tetraacetic acid $Na_3$ salt. We have found that the material which crystallizes from this buffer solution is extremely pure, has well defined crystalline structure, has a rate of solution conspicuously greater than ethylene diamine tetraacetic acid $Na_2$ salt crystallized from solutions of $Na_2$ ethylene diamine tetraacetic acid. The material crystallized from the buffer solution which ranges from chemical neutrality to slightly alkaline, pH 6.8–7.5, exhibits the expected pH for $Na_2$ salt, pH 5.5, when it is dissolved in pure water.

The following procedure produces $Na_2$ ethylene diamine tetraacetic acid dihydrate of excellent purity, of high rate of solubility with the byproduct being a solution consisting largely of $Na_3$ ethylene diamine tetraacetic acid, but containing some $Na_2$ ethylene diamine tetraacetic acid. The mother liquor has the surprising characteristic of possessing a higher chelating power per gram of saturated solution than it is possible to get from either a straight solution of either pure $Na_2$ ethylene diamine tetraacetic acid or pure $Na_3$ ethylene diamine tetraacetic acid, and indicates a marked deviation (approximately 23 percent) from expected solubility of $Na_3$ salt.

Thus, it will be seen that fundamentally, our process involves providing a medium in which the sodium salt (alkali metal salt) of ethylene diamine tetraacetic acid is in solution, adding sufficient sodium hydroxide (alkali metal hydroxide) to bring the pH to a range of 6.8–7.5, and preferably 7.0–7.3, and then evaporating and concentrating the solution at a pH level corresponding to that of the salt desired. Thus, the sodium salt desired is crystallized from a buffered medium and apparently, because it is in a buffered medium a theoretical salt relationship with hydrated product is produced.

The following example will develop the stoichiometric relationships in greater detail.

EXAMPLE I

To 5,000 parts of 38 percent aqueous solution of ethylene diamine tetraacetic acid $Na_4$ (5 part-moles) at 90–95° C. is added 1,000 parts of solid ethylene diamine tetraacetic acid (3.42 part-moles). Unless the free caustic content of the $Na_4$ solution is excessively high, the pH of the resulting slurry should be between 6.8–7.5 and preferably 7.0–7.3. If higher than this, more acid should be added to reduce the pH to 7.5. The slurry is then boiled until 2,000 parts of water have been removed. The slurry is then cooled and filtered. The filtrate as indicated from pH or from chelating power is essentially ethylene diamine tetraacetic acid $Na_3$ salt containing only relatively small amounts of disodium salt.

It must also be understood that all commercial solutions of $Na_4$ ethylene diamine tetraacetic acid contain free caustic to an extent which may vary from ½ to 3 percent. Presence of this free caustic lowers $Na_2$ salt yields to some extent and produces a higher ratio of $Na_3$ salts in solution.

If less acid is used to neutralize, the $Na_4$ salt yields will drop and the amount of mother liquor remaining will increase. It is usually not practicable to attempt to precipitate the $Na_2$ salt from a solution which contains more than 50 percent mole ratio basis of $Na_3$ salt.

If more solid ethylene diamine tetraacetic acid is used, the pH of the mother liquor will drop and while the yield of disodium salt will increase, solubility characteristics will approach those of the $Na_2$ salt prepared by neutralizing ethylene diamine tetraacetic acid with caustic in a pure water solution. It is generally considered impractical to prepare the rapidly dissolving $Na_2$ from solutions which contain more than 5 moles of disodium to 1 of $Na_3$. This should not, however, be considered a limit since even the presence of small amounts of $Na_3$ salt during the crystallization operation will tend to increase the rate of solubility of the $Na_2$ salt crystals which are formed.

This method of manufacture of ethylene diamine tetraacetic acid $Na_2$ salt has several advantages over the three methods presently being used.

The dry mix method, using only small amounts of water, economically produces a product using a minimum of production time and yields no liquor to be disposed of. However, since the amount of water used is very limited, the reaction is frequently incomplete and the resulting product is actually a mixture of unreacted ethylene diamine tetraacetic acid, ethylene diamine tetraacetic acid $Na_2$ salt, ethylene diamine tetraacetic acid $Na_3$ salt, and ethylene diamine tetraacetic acid $Na_4$ salt. Furthermore, the product is very slow in dissolving. Our new method produces a homogeneous product which dissolves extremely rapidly.

The wet method, the second outlined above, products a product of very high purity. However, production time required for this material is very long and the product is also slow in dissolving. Our new method requires much less production time and the product has a high rate of solution.

The third method, indicated above, is used only when a product having a very rapid rate of solution is desired since the production costs are very high due to the spray-drying operation. Our method avoids this costly operation and produces a product having a rate of solution at least as good, but usually greater than that produced by spray drying.

Our method has one additional advantage over any of the three presently used processes. Each of these used ethylene diamine tetraacetic acid as the source ethylene diamine tetraacetic acid. In our method, only 40 percent of the ethylene diamine tetraacetic acid comes from the acid, the remaining 60 percent being from 38 percent ethylene diamine tetraacetic acid $Na_4$ solution. Since the latter is the cheaper commercial source of ethylene diamine tetraacetic acid, this is an additional cost saving feature of our method. The salt is available in this form because it is produced directly as such solution in the method described in U.S. Pat. No. 2,407,645.

For aid in extending the example to preparation of other salts, the following pH data on ethylene diamine tetraacetic acid and nitrilo triacetic acid are useful:

| | Salt | pH |
|---|---|---|
| EDTA | – $Na_4$ | |
| | – $Na_3$ | 7.5 |
| | – $Na_2$ | 5.5 |
| | – Na | |
| NTA | – $Na_3$ | |
| | – $Na_2$ | 8.6 |
| | – Na | |

Following the procedure of example I, it is possible to prepare any of the alkali metal salts of ethylene diamine tetraacetic acid and nitrilo triacetic acid. The procedure can be extended further to diethylene triamine pentaacetic acid and tetraethylene pentamine hexacetic acid. It will be noted that these compounds merely add an ethylene amine moiety to the EDTA. Similarly, salts of hydroxyethyl variants of those compounds may be prepared, provided, no more than about one-half of the acetic acid moieties are replaced by hydroxyethyl groups; thus, hydroxyethyl ethylene diamine triacetic acid; hydroxyethyl diethylene triamine pentaacetic acid; hydroxyethyl triethylene pentamine hexacetic acid, etc. The potassium salts are prepared in the same fashion as the sodium salts and, inasmuch as the pH of the several alkali metal salts does not differ materially from the pH of the sodium salts, the procedure is the same.

Basic to the operation is the matter of starting with a solution of the salt of the acid to be prepared. Commonly, this is the fully neutralized salt, as it comes from the process in which it is prepared. The process is made operable, and conveniently so, because the polyfunctional acid form of the NTA, EDTA and multiples thereof are good buffers. Thus, they can be neutralized to the pH level desired and will hold the pH quite well while water is removed and crystallization of the partially neutralized salt occurs.

Thus, for example, nitrilo triacetic acid disodium salt may be prepared by admixing 100 parts of solid nitrilo triacetic acid with 500 parts of a 38 percent, by weight, aqueous solution of nitrilo triacetic acid trisodium salt at 90° C.–95° C. to produce a slurry having a pH level of 7.0–7.3. The resulting slurry is boiled to dissolve the acid and evaporated to a suitable concentration whereupon, on cooling, the precipitated disodium salt is readily recovered.

EXAMPLE II

In experimental verification of the fact that the partially neutralized salt prepared in accordance with the method of this invention has a greater rate of solubility than salts prepared by conventional methods, the following comparative test was conducted. This involved comparing the rate of solubility of a disodium salt prepared in accordance with our specification with the rate of solubility of a disodium salt prepared in accordance with a typical, well-known prior art procedure.

Thus, a disodium salt was prepared in accordance with our process whereby 500 parts of 38 percent aqueous solution of ethylenediamine tetraacetic acid $Na_4$ at 70° C. was admixed with 400 parts of water and 170 parts of ethylenediamine tetraacetic acid. This yielded a slurry of pH 7.0–7.3. The slurry was boiled until about 200 parts of water had been removed whereupon it was cooled, filtered, and washed, resulting in the recovery of the disodium salt.

The prior art disodium salt was prepared by means of the following procedure:

10 moles of ethylene diamine as a 30 percent aqueous solution and 4 moles of solid caustic soda were placed in a steam-heated kettle supplied with an agitator. Eight moles of sodium cyanide as a concentrated water solution (about 30 percent) were added and the solution heated to 60° C. About a 10-inch vacuum was applied to bring the liquid to incipient boiling. Formaldehyde (7.5 moles of 37–40 percent aqueous solution) was slowly added, the temperature being held at 60° C., and the solution vigorously stirred. Then, when the evolution of ammonia has substantially stopped, 8 more moles of sodium cyanide, followed by 8 moles of formaldehyde was added as before. This was continued until 40 moles of cyanide and 40 moles of formaldehyde had been added. Then at the end about 2 moles more of formaldehyde were added, making 42 in all, to remove any last traces of cyanide. About 8 to 10 hours were required to complete the reaction. The resulting product, referred to herein as the crude reaction product was essentially an aqueous solution of the tetrasodium salt of ethylene diamine tetraacetic acid.

Thereafter, 1,000 grams of the crude reaction product, i.e. a 25 percent, by weight, aqueous solution of EDTA $Na_4$, were added to 264 grams of ethylene diamine tetraacetic acid; the pH level of the system being 4.1. The mixture which had initially gelled and was therefore thinned, was heated to boiling and allowed to cool and crystallize. The formed disodium crystals were then filtered, washed and dried.

The solubility of each of these materials was determined by admixing the respective salts, under constant agitation at a temperature of 20–22° C., with sufficient distilled water to make a 9 percent, by weight, solution of the salt and noting the time required for total solubility to occur, the latter state being determined by the clarity of the solution.

As a result, the disodium salt of this invention completely dissolved in 2 minutes while the prior art material did not exhibit total solubility after an agitation period in excess of 2 days. The surprising solubility differences thus noted are a clear indication of the advantages to be derived from the practice of the novel process of this invention and, furthermore, lend great weight to the distinctions between the subject process and the prior art; notably the pH differences.

EXAMPLE III

Additional commercial forms of the disodium salt of ethylenediamine tetraacetic acid were also tested for their solubility characteristics by means of the procedure described in example II, hereinabove.

The products tested included:
HCC powder—prepared by reacting under agitation 2 moles of flake caustic soda with 1 mole of damp ethylenediamine tetraacetic acid and then heating to produce the dry powder product.

Sequestrene Na$_2$—prepared by reacting EDTA acid, water and NaOH so that at boil, a solution of approximately 28 percent concentration and having a pH level of 4.5 –5.5 results which upon cooling yields the crystalline products.

F.S. disodium—prepared by reacting 2 moles of 50 percent caustic solution with one mole of EDTA acid which had been slurried with hot water so that at boil, the solution is of 25 percent concentration and then filtering, cooling and drying crystalline product.

Spray dried product—prepared in same manner as F.S. disodium with the exception hat clear solution is spray dried instead of being chilled and crystallized.

Commercial product—prepared by reacting dry or damp EDTA acid with a hot 38 percent solution of EDTA Na$_4$—EDTA acid added under agitation at 80° C., until pH level reaches 5.2–5.4—slurry then cooled, centrifuged and dried.

TABLE

| Product | Time Required for a % Solution to become completely clear |
| --- | --- |
| HCC powder | 19 Hours |
| Sequestrene Na$_2$ | 9 to 13.5 Minutes |
| F.S. disodium | 17 Hours |
| Spray dried | 4 Minutes |
| Commercial Product | 50 Minutes |
| Method per Example I | 2 Minutes |

The results in the tabulation speak for themselves despite the fact that the disodium salt, for example, prepared in accordance with the example I shows no chemical difference from disodium salt, or a mixture which would analyze as disodium salt, prepared by any other method. There appears to be some subtle effect on the crystal structure induced by the instant method of crystallization which causes the material to dissolve in water far more rapidly than conventional known material.

What is claimed is:

1. A process for the production of a disalt of a compound selected from the group consisting of nitrilo triacetic acid, ethylene diamine tetraacetic acid, diethylene triamine pentaacetic acid and variants of those acids wherein not more than one-half of the acetic acid moieties are replaced by hydroxy ethyl groups, comprising providing a solution of the salt fully neutralized, adding thereto solid-free acid in an amount sufficient to neutralize an amount of the salt to the predetermined level, the resulting mixture having a pH level of from about 6.8 to 7.5, boiling said mixture of solid and salt solution to dissolve the solid acid and continuing boiling the solution to evaporate at least part of the water, and separating the salt crystals formed in the medium.

2. A process in accordance with claim 1 for the production of disodium salt of ethylene diamine tetraacetic acid which comprises providing a solution of the tetrasodium salt of ethylene diamine tetraacetic acid, adding thereto solid-free acid in acid form and in amount to develop a solution of pH of 7.0–7.3, boiling said mixture of solid acid crystals and salt solution to form a solution and to evaporate at least part of the water and then separating the disodium salt crystals formed in the medium.

3. A method in accordance with claim 2 wherein the free solid ethylenediaminetetraacetic acid is added to an alkaline solution of about 40 percent concentration, the relative amounts being about 1 part of solid acid to 5 parts of solution, by weight.

4. A process in accordance with claim 1 for the production of nitrilo triacetic acid disodium salt wherein solid nitrilo triacetic acid is added to a 38 percent nitrilo triacetic acid trisodium salt aqueous solution at 90° C.–95° C. to produce a slurry of solution pH 7.0–7.3, boiling said slurry to dissolve the acid and evaporating to a suitable concentration, and then cooling and recovering precipitated di-sodium salt.